US009992974B2

(12) United States Patent
James

(10) Patent No.: US 9,992,974 B2
(45) Date of Patent: Jun. 12, 2018

(54) ANIMAL RELEASE TOOL

(71) Applicant: Paul James, Cardiff (GB)

(72) Inventor: Paul James, Cardiff (GB)

(*) Notice: Subject to any disclaimer, the term of this patent is extended or adjusted under 35 U.S.C. 154(b) by 176 days.

(21) Appl. No.: 14/962,270

(22) Filed: Dec. 8, 2015

(65) Prior Publication Data

US 2016/0135429 A1 May 19, 2016

Related U.S. Application Data

(63) Continuation-in-part of application No. PCT/GB2014/051786, filed on Jun. 10, 2014.

(30) Foreign Application Priority Data

Jun. 10, 2013 (GB) .................................. 1310258.7
Dec. 10, 2013 (GB) .................................. 1321784.9

(51) Int. Cl.
*A01K 15/02* (2006.01)

(52) U.S. Cl.
CPC ............ *A01K 15/02* (2013.01); *A01K 15/029* (2013.01)

(58) Field of Classification Search
CPC .... A01K 15/02; A01K 15/021; A01K 15/022; A01K 15/029; A61H 23/0263
See application file for complete search history.

(56) References Cited

U.S. PATENT DOCUMENTS 4,180,013 A 12/1979 Smith
6,460,489 B1 * 10/2002 O'Byrne .............. A01K 15/029 119/719
8,342,134 B2 1/2013 Lee et al.
2001/0047189 A1 * 11/2001 Griffith ................. A61J 17/001 606/234
2002/0148414 A1 10/2002 O'Byrne
2005/0109286 A1 * 5/2005 Lange .................. A01K 15/029 119/719
2008/0134987 A1 6/2008 Lee et al.
2008/0156277 A1 7/2008 Mainini et al.
2013/0158447 A1 * 6/2013 Shabazian .......... A61H 23/0263 601/46
2013/0330681 A1 * 12/2013 Sacks ....................... A61D 5/00 433/1
2014/0357944 A1 * 12/2014 Spietz .................... A61H 19/40 600/38
2015/0090193 A1 * 4/2015 Giarrizzo ............. A01K 15/026 119/709
2016/0015596 A1 * 1/2016 Murison ............ A61H 23/0263 600/38
2016/0121062 A1 * 5/2016 Davenport ............. A61B 5/097 601/47

FOREIGN PATENT DOCUMENTS

WO WO 2005072519 A1 * 8/2005 ........... A01K 13/001

* cited by examiner

*Primary Examiner* — Kristen C Hayes
(74) *Attorney, Agent, or Firm* — King & Schickli, PLLC

(57) ABSTRACT

A battery operated animal release tool and associated method for initiating release of the clamped jaws of e.g. a dog, including a vibratable probe connected at a proximate end to a handle, and an actuator for selectively operating the vibration of the vibratable probe, at least part of the vibratable probe being selectively moveably mounted to cause vibration of a distal end of the vibratable probe remote from the handle, wherein in use the tool is arranged to communicate a vibrating sensation to the mouth of the animal on contact of the probe with the animal.

12 Claims, 6 Drawing Sheets

ANIMAL RELEASE TOOL

This invention relates to an animal release tool, in particular, but not exclusively, for initiating release of a clamped jaw of a dog.

BACKGROUND OF THE INVENTION

Dogs are a popular pet, each having their own personality and known breed characteristics. It is a common desire for a pet dog to fit into an owner's daily lifestyle where it is required for the dog to behave in a controlled manner, whether inside or outside of the home. Therefore, it is common practice to train dogs so that they are responsive to commands enabling them to be guided away from dangerous or unwanted scenarios. It is believed that training a dog is both beneficial to the safety of the dog and the general environment of the dog, it's owner and others in the dog's vicinity.

There are many ways of training a dog. Some techniques rely solely on giving the dog a treat when they perform a desired act so as to encourage them to repeat the behaviour. However, it can take weeks to train an obstinate dog using this technique. Alternatively the dog trainer may apply a short sharp tap to the dog using a prodding stick or their hand. This technique is particularly useful to command the attention of the dog when it has become distracted and engrossed in an unwanted act. The dog may then associate the 'tap' with the unwanted act which may make them less inclined to repeat the act. However, it may be difficult to define what is a 'tap' and some people may be too heavy handed thereby inflicting unnecessary pain on the dog, which is clearly undesirable.

A growing concern, which is often reported in the news, is the handling and discipline of dangerous dogs. It is known for such dogs to be uncontrollably overcome by their animal instinct and in some cases this can lead them to attack a person or other animal. Such an attack can lead to life changing injuries and even death of the person or animal. It is important for 'responsible' owners to have a means of dealing with their dogs when such unexpected aggressive episodes arise. In particular there is a need to provide a means to enable release of a dog when its jaws are fixed to a person or animal.

In such cases it is known to use mechanical leverage devices or electric shock devices to discourage dogs from behaving in an aggressive or unwanted manner, the latter usually being used in dangerous situations, for example when a dog has bitten a person. However, the leverage device very much depends on the relative strength of the user and the dog, and may not be feasible when the jaw of a dog has made contact with, for example, a person. The electric shock device inflicts pain on the dog and can debilitate a large dog such that the dog cannot respond to commands of stimuli for a minute or more. Inflicting such pain on an animal is not considered to be a particularly humane act. However, it is effective in extreme scenarios.

The present invention is derived from the realisation that there exists a need to stabilise an animal, for example a dog, when they become aggressive so as to prevent them biting a person or animal, or to encourage them to release an item from their jaws, without the need for inflicting pain or debilitation to the dog, and to remove the need for a recovery period. There is also a desire to provide a training device that speeds up the training process by deterring the dog from doing certain acts in a humane manner and which can be used as a 'memory aid'. Therefore, a tool that can be used as a deterrent in dangerous scenarios, a deterrent whilst training the dog and a tool to encourage release of an object from a dog's jaws is required, that is also capable of alleviating the problems described above.

SUMMARY OF THE INVENTION

Accordingly, this invention provides a battery operated animal release tool and associated method for initiating release of the clamped jaws of e.g. a dog, including:

a vibratable probe connected at a proximate end to a handle means, and an actuator for selectively operating the vibration of the vibratable probe, at least part of the vibratable probe being selectively moveably mounted to cause vibration of a distal end of the vibratable probe remote from the handle means, wherein in use the tool is arranged to communicate a vibrating sensation to the mouth of the animal on contact of the probe with the animal.

Preferably, the release tool is a battery operated dog bite release tool, the tool comprising a handle, and a vibratable probe extending from the handle, the probe tapering towards its distal end whereby to permit it to be placed between the clamped jaws of the dog when the probe is activated, thereby to induce the dog to release its bite.

Conveniently, the forward tip or distal end of the probe is flattened in the form of a beak so as to more easily facilitate its insertion between the clamped jaws of a dog so that vibrations can be transmitted therebetween. The vibrations are preferably generated by means of an out-of-balance electrically operated motor mounted within the probe such that, upon activation by the actuator, the motor causes the probe to vibrate.

Alternatively, the vibratable probe includes a vibration transfer member arranged in vibrational communication with an arm is extending from the handle so as to permit transfer of the vibration from the tool to e.g. the mouth of the dog when contact is made between the dog and the vibration transfer member. The arm provides a rigid internal structure for the probe and protects rotation of the axle.

Beneficially, a sleeve is arranged coaxially with the arm so as to extend along the arm and to optimise the vibrational communication therebetween.

Preferably, the sleeve is made of natural or synthetic rubber so as to improve the grip of an object to be applied thereto.

Beneficially, the vibration transfer member is detachably couplable to the sleeve so that it can be secured to the sleeve when in use and can be removed when not in use, thereby enabling the tool to be placed in a user's pocket.

Preferably, the vibration transfer member is couplable to the sleeve in a friction fit. This ensures that the vibration transfer member is held in position when operated, but enables the user to remove the vibration transfer member when the tool is to be stored.

Beneficially, the vibration transfer member is made of a resilient material so that it can keep its shape when contact is made with the dog or other animal.

Preferably, the moveable part of the probe comprises a vibration generating means rotatable about an axle. The movement of the vibration generating means causes the vibration of the tool.

Desirably, the vibration generating means is caused to rotate by a transducer. Therefore an electrical or other energy source can be applied to cause movement of the vibration generating means.

Preferably, the vibration of the distal end of the probe is electrically generated, such as by means of a crank-coupled electric motor in the handle or an out-of-balance motor at the distal end of the probe.

Beneficially, the handle is a housing of the tool from which the vibratable probe extends. This means that the housing is sized to be held in the user's hand.

Desirably, a guard portion is positioned intermediate the handle and the vibratable probe so as to protect the user's hand in use.

Preferably, the guard portion is substantially planar and extends around the circumference of the tool to give maximum protection to the hand of a user.

Beneficially, the outer perimeter of the guard portion has an ellipsoidal shape so as to enable the user to insert the tool in a pocket.

Desirably, the handle, the vibratable probe and the guard are a single integrated unit, thus providing for a more robust system free from moving parts and prohibiting the loss of key parts. This is especially important for when the tool is to be transported.

Preferably, the actuator is a switch for switching between a first state prohibiting vibration of the vibratable probe and a second state causing vibration of the vibratable probe. Therefore, when the is device is to be implemented the tool is caused to vibrate, but when the tool is to be transported or stored the battery is conserved by ceasing the vibration.

Whilst the invention has been disclosed above it extends to any inventive combination of the features set out above, or in the following description, drawings or claims.

BRIEF DESCRIPTION OF THE DRAWINGS

The invention will now be described, by way of an example only, with reference to the accompanying drawings in which.

DETAILED DESCRIPTION OF THE DRAWINGS

Figure 1:
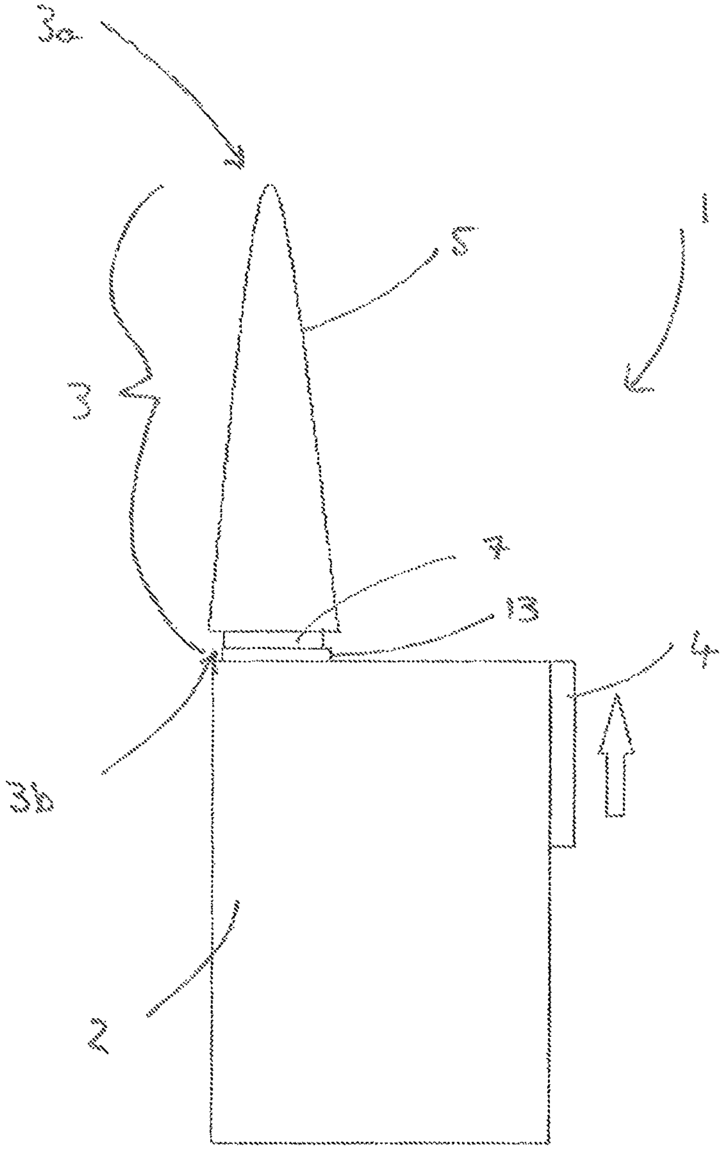
FIG. 1 is a side view of the animal release tool.

FIG. 1 shows an animal release tool having a handle 2, for example a housing of the tool 1 which is capable of being held in a person's hand. A vibratable probe portion 3 is connected at a is proximate end 3*b* to the handle 2. An actuator 4, for example a switch, is arranged for selectively operating the vibration of the probe 3. The switch 4 is located on the outer surface of the housing 2 and is moveable between a first and a second position to activate a first and second state of the vibratable probe 3. In the first state the distal end 3*a* of the probe 3 remote from the handle 2 (or housing) is caused to vibrate and in 10 the second state the distal end 3*a* of the probe 3 remote from the handle 2 (or housing) is prohibited from vibrating. The switch 4 of FIG. 1 is shown to be a slider, but other switches may also be applied e.g. a pressable switch. By locating the switch 4 on the outer surface of the handle 2 or housing it can be easily accessed by the user's thumb when the handle 2 is positioned within the user's hand.

At least part of the probe 3 is moveably mounted so as to cause vibration of the distal end of the probe 3*a* remote from the handle. The probe 3 itself is formed of several elements including a vibration transfer member 5. The member 5 is formed of a resilient yet flexible material, for example a plastic, and can be elongate to permit use of the device at a distance away from the animal. The shape of the vibration communication member 5 is preferably frustoconical, but other shapes may be used if preferred.

Figure 2:
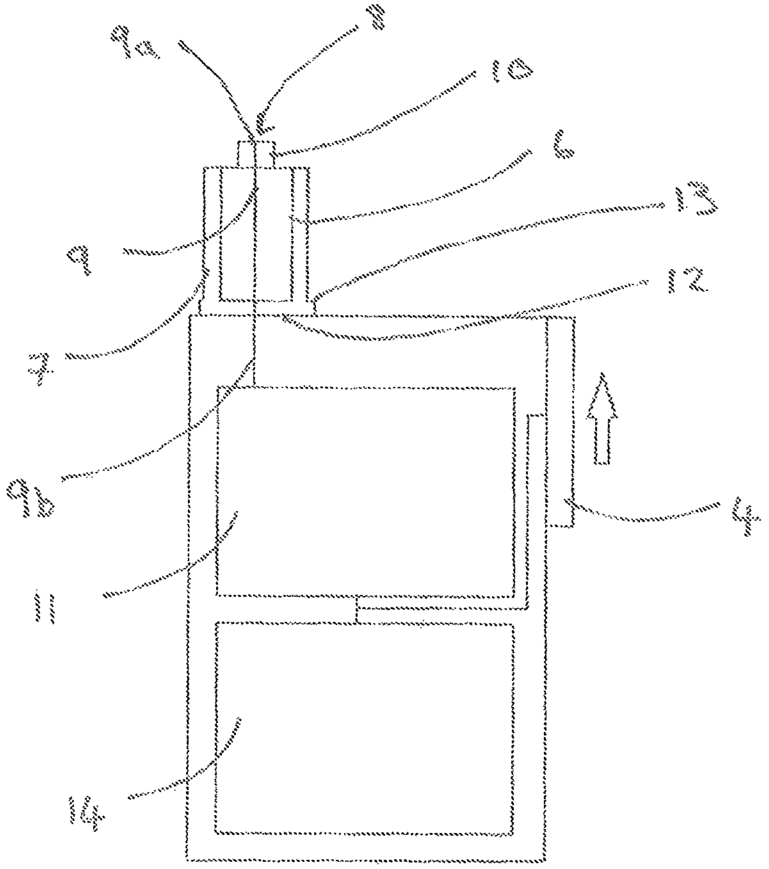
FIG. 2 is a cross sectional view of the animal release tool.
Figure 3:
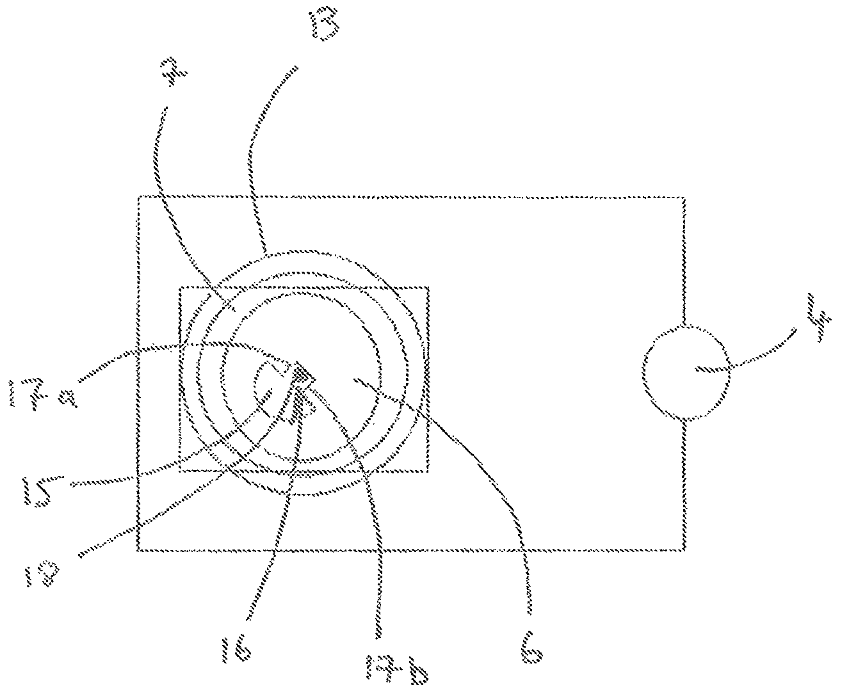
FIG. 3 is a top view of the animal release tool.

FIG. 2 and FIG. 3 show an arm 6 extending from the handle 2 to which the vibration transfer member is mounted. Therefore the vibration transfer member 5 is in vibrational communication with the arm. A sleeve 7 is coaxially arranged with respect to the arm 6. The is sleeve 7 is made of rubber and the vibration transfer member 5 is couplable to the sleeve 7 in a friction fit whereby the outer surface of the sleeve 7 is cooperable with the inner surface of at least a portion of the vibration transfer member 5.

FIG. 2 shows further elements of the probe 3 including the moveable part of the probe to be a vibration generating means 8 rotatable about an axle 9. The vibration generating means 8 is a moveable element 10 fixed to the axle 9 which extends through the arm 6. The axle 9 and the arm 6 are in vibrational communication with each other. The first end of the axle 9*a* is positioned within the housing 2 and is mechanically couplable to a transducer 11, for example an electric motor. The axle 9 extends through an aperture 12 located in a side of the housing 2 so that the second end of the axle 9*b* is positioned external to the housing 2 and within the vibration transfer member 5 when it is coupled to the sleeve 7. The sleeve 7 includes a collar 13 which substantially covers the aperture 12 of the housing 2 so as to substantially seal the interior of the housing 2 from any external elements. The vibration of the probe 3 is electrically generated by means of the motor 11 powered by an electrical energy source 14, for example a battery. The housing 2 encases the motor 11, or other transducer, and the battery 14. The switch 4 connects the power supply 14 to the motor 11 when in the second state so as to cause rotation of the axle 9 and to cause rotation of the movement element 10. In the first state the battery 14 is disconnected from the motor 11 and the axle 9 remains stationary.

When the movement element 10 rotates the arm 6 is caused to vibrate and since the vibrational transfer member 5 is in vibrational communication with the arm 6, via the sleeve 7, it is also caused to vibrate.

FIG. 3 shows the relative coaxial arrangement of the axle 9, arm 6 and sleeve 7. It also shows that the switch 4 is positioned on one side of the handle 4 at the end of the device from which the probe 3 extends.

The shape of the movement element 10 is shown as a sector of a circle 15 terminated by a catch portion 16 formed of two prongs 17*a*, 17*b* and a recess 18 therebetween. The axle 9 is positioned between the two prongs 17*a*, 17*b* within the recess 18 so as to fixably secure the movement element 10 onto the axle 9. The movement element is effectively an off-centre weight. Rotation of the axle 9, and therefore the movement element 10, causes vibration of the tool 1. This vibration can be projected at a greater distance by using an elongate vibration transfer member 5 which makes it useful to deploy the device at a distance away from the animal. The maximum distance equates to the length of the vibration transfer member 5 and different vibration transfer members of varying lengths may be provided for the tool 1.

Figure 4:
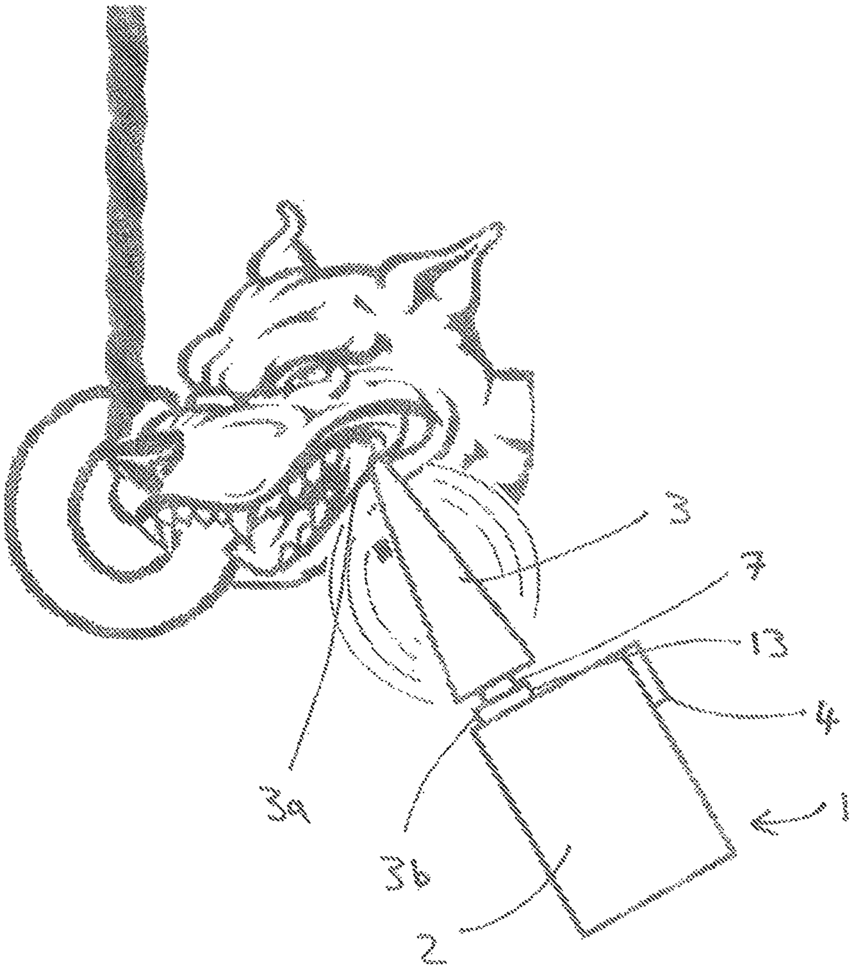
FIG. 4 is a perspective view of the animal release tool in use.

FIG. 4 depicts the animal release tool 1 in use, whereby the user holds the housing 2 or handle in their hand and places the vibration transfer member 5 over the sleeve 7 such that it is secured in a friction fit thereto and so that it is positioned over the vibration is generating means 8. The user then activates the switch 4 by switching it between the first position and the second position so as to cause movement of the vibration generating means 8. This then causes vibration of the arm 6, the sleeve 7 and consequently the vibration transfer member 5. In particular it is important for the distal end 5*a* of the vibration transfer member that is remote from the handle 2, or housing, to vibrate because it is this part of the tool 1 that is brought into contact with the dog, for example the dog's nose. In the case when a dog has its jaws around a person, applying the distal end 3*a* of the vibrating vibration transfer member 5 to the dog's nose will cause the dog to release the person from its jaws.

Figure 5:
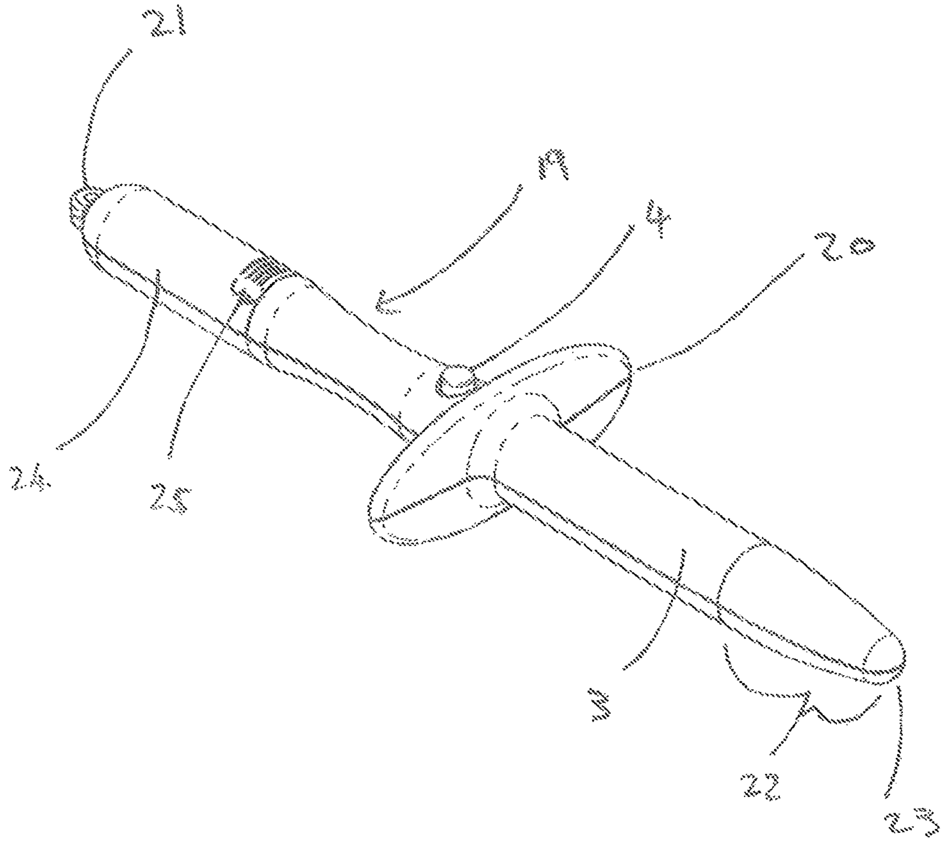
FIG. 5 is a perspective view of a second embodiment of the invention.

In a second embodiment of the invention, as shown in FIG. 5, the animal release tool has a substantially tubular handle 19, a substantially tubular vibratable probe portion 3 and a guard portion 20 positioned there-between. The guard portion is a substantially planar arrangement having an elliptically shaped outer perimeter, for example an oval, to permit insertion of the release tool into a user's pocket. Alternatively, the outer perimeter of the guard portion 20 may take another shape, for example it may be circular or rectangular. The guard portion 20 is ultimately arranged to, in use, protect the hand of the user as they hold the handle 19 of the tool 1 and apply it to an animal. Therefore, the guard portion extends outwardly and substantially perpendicular from the longitudinal axis of the tool, thereby extending outwardly around the circumference of is the tool.

The switch 4 in FIG. 5 is a button projecting from the surface of the handle 19 which is pressable to actuate or terminate the vibration of the tool 1. Whilst the handle 19 is substantially cylindrical it is contoured to as to improve the ergonomics to the user whereby the handle 19 is shaped to mould to the users hand, enabling an improved grip on the device. The end of the handle 19 is curved and is terminated by an eyelet 21 for use with a tether (not shown), for example a looped tether for use around a user's wrist, or for storage on a hook. The outer body of the animal release tool 1 is formed of two molded halves fixed together by fasteners, e.g. a first and second screw spaced apart along the longitudinal axis of the tool. Therefore, the handle 19, vibratable probe portion 3 and guard 20 form a single integrated unit having a smooth surface free of sharp or jagged corners (for the safety of the user and the animal to which it is to be applied). The vibratable probe portion has a tapered free end 22 that terminates at a curved apex 23.

The battery and electronic components (not shown) are stored within the handle 19 and are accessible via a removable cover 24 positioned on one side of the handle 19. Removal of the cover 24 is facilitated by a finger grip 25 formed of an array of linear projections positioned on the surface of the handle and on the removable cover. As an alternative to the projections, or in addition thereto, an array of recesses may be applied.

Figure 6:
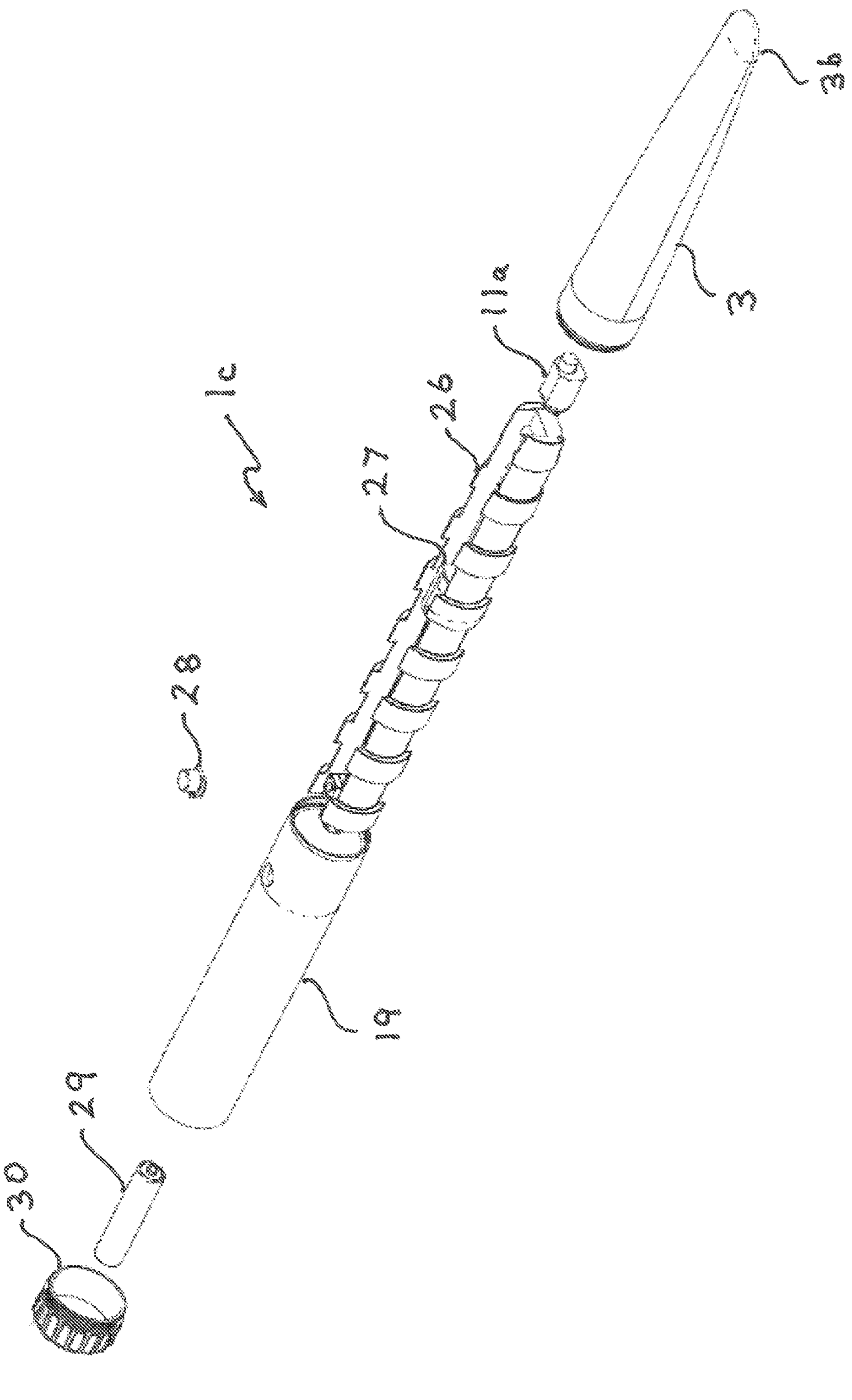
FIG. 6 is an exploded perspective view of a third embodiment of the invention suitable for use in the gloved hand of e.g. a Police dog handler.

Turning now to the embodiment of the invention shown in FIG. 6, it will be noted that, unlike the second embodiment shown with reference to FIG. 5, the release tool 1*c* has no finger guard 20 between the proximate and distal ends of the handle 19 and probe portion 3 so as to present a smooth profile ideally suited for insertion within a pocket of e.g. a policeman's uniform. The forward tip or distal end 3*b* of the probe 3 is also flattened in the form of a beak so as to more easily facilitate its insertion between the clamped jaws of a dog so that vibrations can be transmitted therebetween. These vibrations are generated in this instance by means of an out-of-balance electrically operated motor 11*a* mounted at the distal end of a partially hollow spine 26 which at that end supports and is enclosed by the probe 3, and at its other end supports and is enclosed by the handle 19. The spine 26 also includes a switch mechanism 27 and associated push-button switch 28 by which the motor 11*a* can be switched on and off with power from a removable battery 29 and associated end cap 30. The end cap 30 may conveniently include an eyelet or other means by which it can be temporarily fastened to the outside of e.g. a policeman's uniform in preference to the release tool 1*c* being stored within a pocket.

The embodiment shown with reference to FIG. 6 can be easily disassembled and reassembled, if necessary with replacement parts and has been found in field trials to be particularly suitable for the disciplined services such as the Police. However, it should be noted that these same field trials have also shown that the first and second embodiments of the invention have also been found to be extremely effective in inducing the involuntary release of clamped jaws as a result of the unusual sensation of vibrations being felt between the gums of the biting animal. The invention therefore provides a safe and effective way of painlessly persuading e.g. a biting dog, to release the bite, whether it be on an inanimate object such as a ball or in more stressful circumstances on e.g. the arm of a criminal being pursued by the Police, where the dog's natural instincts are to keep its jaws clamped tightly shut even if its handler has ordered release of the victim.

Various modifications to the principles described above would suggest themselves to the skilled person. For example, the outer surface of the housing or handle 2 may include a ribbed feature to improve the grip of the user. In the case where the housing was made to a size greater than a person's hand, a handle (not shown) may be fitted on an outer surface of a separate housing to enable the user to hold the animal release tool securely. The switch 4 may then either be positioned on the outer surface of the housing or the handle as appropriate.

The battery 14 may be a removable rechargeable battery, alternatively there may be included a power port (not shown) and adapter for recharging the battery with mains electricity.

Whilst it is described for the switch 4 to disconnect the connection between the electrical power source 14 and the motor 11, in an alternative embodiment the switch 4 may disconnect the axle 9 from the motor 11.

The vibration transfer member 5 can be connected to the arm 6 by means of a screw and thread arrangement or a bayonet type fitting, however these arrangements are less desired since the vibrations may cause release of the vibration transfer member and would cost more to manufacture than a rubber sleeve.

Whilst the probe 3 has been described as being positioned external to the housing, or handle 2, it may form part of the housing or handle, or indeed may be positioned internal to the housing or handle. It would then be necessary for the vibration transfer member 5 to be modified accordingly so as to extend from within the housing or handle 2. It is also envisaged that the vibration transfer member 5 may be extendable from a first stored arrangement to an extended arrangement similar to the mechanism for a standard car aerial.

The vibration generating means 8 may not be moveable in a rotating motion, but may instead be caused to move in a reciprocating linear motion, or other oscillating motion, so as to generate the desired vibration of the probe 3. However, it is envisaged that more mechanical parts would be required to enable this arrangement.

Whilst it has been described for the actuator to causes a vibrating and non-vibrating state, alternatively the actuator may enable different vibration speeds to be selected.

The actuator may not be positioned on the side wall of the housing, or handle and may instead be placed at the distal end of the handle.

Whilst it is clear that it is important for the animal release tool be used so as to encourage a dog to release an object it is clamping between its jaws, it is also suitable for use in training a dog and is particularly useful in training gun dogs. This tool is also expected to aid the training of other working or service dogs, including police dogs, hearing dogs or guide dogs.

The tool is believed to be safe for both the dog and the owner, is very easy to use and almost instantaneous in operation. Beneficially, the tool works without the use of any invasive "mechanical leverage" or electric shock to force or paralyse the animal. Also the animal remains responsive and stable upon deployment and there is no recovery period as with electronic prods or collars. When used for training a dog, it is intended for the animal release tool to be used in conjunction with a simple vocal and hand signal. Once the dog has been trained, the device need not be used for some time due to the "memory effect" engendered in a simple training regime, however the device may be used to remind the dog that a certain act is not permitted from time to time. This is known as "topping up". Also, since the dog can remember the device from a previous occasion mere display of the device could warn the dog from several meters distance, which is useful for postal workers or other home delivery workers.

The invention claimed is:

1. A battery operated animal release tool for initiating release of a clamped jaws of a dog, including:

a vibratable probe connected at a proximate end to a handle adapted to carry one or more batteries;

an electrically operable motor for selectively operating via an electric switch the vibration of the vibratable probe, at least part of the vibratable probe being selectively moveably mounted to cause vibration of a distal end of the vibratable probe remote from the handle; and a guard portion positioned intermediate the handle and the vibratable probe, the guard portion adapted to protect the hand of the user of the tool from the jaws of the dog;

wherein in use the tool is arranged to communicate a vibrating sensation to the animal on contact of the probe with the animal.

2. An animal release tool according to claim 1 wherein the probe tapers towards a distal end whereby to permit it to be placed between the clamped jaws of the dog when the probe is activated, thereby to induce the dog to release its bite.

3. An animal release tool according to claim 1 wherein, a forward tip or distal end of the probe is flattened in the form of a beak so as to more easily facilitate its insertion between the clamped jaws of a dog so that vibrations can be transmitted therebetween.

4. An animal release tool according to claim 1 wherein vibrations are generated by means of an out-of-balance electrically operated motor mounted within the probe such that, upon activation by the actuator, the motor causes the probe to vibrate.

5. An animal release tool, according to claim 1 wherein the vibratable probe includes a vibration transfer member arranged in vibrational communication with an arm extending from the handle.

6. An animal release tool, according to claim 1 wherein the moveable part of the vibratable probe comprises a vibration generator rotatable about an axle.

7. An animal release tool according to claim 1, wherein the guard portion is substantially planar and extends radially outward from a circumference of the tool.

8. The animal release tool of claim 7, wherein the vibratable probe defines a first maximum cross-sectional perimeter, the handle defines a second maximum cross-sectional perimeter, and the guard portion defines a third maximum cross-sectional perimeter, and wherein an entirety of the third maximum cross-sectional perimeter extends radially beyond the first maximum cross-sectional perimeter and the second maximum cross-sectional perimeter.

9. A method of inducing the release of clamped jaws of a dog including the steps of:

providing an animal release tool including a probe, activating the tool so that the probe vibrates, and inserting the probe into or between the clamped jaws of the dog to thereby transfer vibrations from the probe to the mouth of the dog to induce release of the clamped jaws.

10. An animal release tool for initiating release of a clamped jaws of a dog, including:

a vibratable probe connected at a proximate end to a handle adapted to carry one or more batteries;

an actuator comprising a switch projecting from an outer surface of the handle adapted for selectively operating the vibration of the vibratable probe; and a guard portion positioned intermediate the handle and the vibratory probe, the guard portion extending radially outward from the tool to define a guard maximum cross-sectional perimeter greater than a handle maximum cross-sectional perimeter and a vibratable probe maximum cross-sectional perimeter;

at least part of the vibratable probe being selectively moveably mounted to cause vibration of a tapered distal end of the vibratable probe remote from the handle, wherein in use the tool is arranged to communicate a vibrating sensation to the animal on contact of the probe with the animal.

11. The animal release tool of claim 10, wherein the guard portion comprises a substantially planar radially extending member.

12. The animal release tool of claim 11, wherein the guard portion is elliptical in shape.

* * * * *